United States Patent
Isler et al.

(10) Patent No.: US 9,705,843 B2
(45) Date of Patent: Jul. 11, 2017

(54) METHOD AND SYSTEM FOR DOMAIN NAME SYSTEM BASED DISCOVERY OF DEVICES AND OBJECTS

(75) Inventors: Bernhard Isler, Wilen b. Wollerau (CH); Christoph Niedermeier, München (DE); Norbert Vicari, München (DE)

(73) Assignee: SIEMENS SCHWEIZ AG, Zurich (CH)

( * ) Notice: Subject to any disclaimer, the term of this patent is extended or adjusted under 35 U.S.C. 154(b) by 225 days.

(21) Appl. No.: 14/346,114

(22) PCT Filed: Sep. 3, 2012

(86) PCT No.: PCT/EP2012/067105
§ 371 (c)(1),
(2), (4) Date: Mar. 20, 2014

(87) PCT Pub. No.: WO2013/041350
PCT Pub. Date: Mar. 28, 2013

(65) Prior Publication Data
US 2014/0222906 A1  Aug. 7, 2014

(30) Foreign Application Priority Data
Sep. 20, 2011  (EP) .................................... 11182014

(51) Int. Cl.
*H04L 29/12* (2006.01)
*H04L 29/08* (2006.01)

(52) U.S. Cl.
CPC ...... *H04L 61/1541* (2013.01); *H04L 61/1511* (2013.01); *H04L 61/303* (2013.01); *H04L 67/10* (2013.01); *H04L 67/16* (2013.01)

(58) Field of Classification Search
CPC ............. H04L 61/1511; H04L 61/1541; H04L 61/303; H04L 67/10; H04L 67/16
See application file for complete search history.

(56) References Cited

U.S. PATENT DOCUMENTS 7,925,782 B2    4/2011  Sivasubramanian et al. ............................ 709/238
(Continued)

FOREIGN PATENT DOCUMENTS

| CN | 102027732 A | 4/2011 | ............. H04L 29/08 |
| CN | 102077189 A | 5/2011 | ............. G06F 15/16 |

(Continued)

OTHER PUBLICATIONS

S. Cheshire et al., "DNS-Based Service Discovery; draft-cheshire-dnsext-dns-sd-10.txt," Internet Engineering Task Force, IETF, Internet Society (ISOC) 4, Rue de Falais Ch—1205 Geneva, Switzerland, No. 10, Feb. 28, 2011, pp. 1-54, printed on Nov. 29, 2012 from http://tools.ietf.org/html/draft-cheshire-dnsext-dns-sd-10.*

(Continued)

*Primary Examiner* — Michael C Lai
(74) *Attorney, Agent, or Firm* — Slayden Grubert Beard PLLC

(57) ABSTRACT

The Specific service instances are requested by a client via a client application. The request is received by a Domain Name System (DNS). The request is resolved by the DNS by determining from information recorded in a DNS system memory and conveyed in the request, a first type T1 of service and a first list L1 of service instances associated with the first type T1. The DNS then searches for a linked structure in a TXT resource record for the first type T1. The linked structure identifies another list L2 of service instances associated with a subtype T2 of service. Then iteratively, for i=2, . . . , N+1, N being a number of the subtypes of service associated with the first type T1 of service, searching a TXT resource record for a linked structure identifying a corresponding subtype Ti of service and identifying a list Li+1 of service instances associated with the subtype Ti+1.

10 Claims, 3 Drawing Sheets

(56) References Cited

U.S. PATENT DOCUMENTS

| | | | |
|---|---|---|---|
| 8,495,190 B2 | 7/2013 | Andrews et al. | 709/223 |
| 2006/0036720 A1* | 2/2006 | Faulk | H04L 41/0622 709/223 |
| 2013/0259027 A1* | 10/2013 | Yu | H04L 65/80 370/352 |
| 2014/0214958 A1* | 7/2014 | Cheshire | H04L 61/1511 709/204 |

FOREIGN PATENT DOCUMENTS

| | | |
|---|---|---|
| EP | 11182014 | 9/2011 |
| KR | 20050008230 A | 1/2005 |
| WO | PCT/EP2012/067105 | 9/2012 |

OTHER PUBLICATIONS

P. van der Stok et al., "CoAP Utilization for Building Control; draft-vanderstok-core-bc-04," Internet Task Force, IETF, Internet Society (ISOC) 4, Rue des Falaises Ch—1205 Geneva, Switzerland, No. 4, Jul. 11, 2001, pp. 1-34, printed on Nov. 29, 2012 from http://tools.ietf.org/html/draft-vanderstok-core-bc-04.*

R. Rosenbaum Digital Equipment Corporation, "Using the Domain Name System to Store Arbitrary String Attributes," 19930501, vol. RFC 1464, May 1, 1993, pp. 1-4, printed on Nov. 29, 2012 from http://tools.ietf.org/rfc/rfc1464.txt.

English language International Search Report for PCT/EP2012/067105, mailed Nov. 23, 2012, 3 pages.

Written Opinion for PCT/EP2012/067105, downloaded from WIPO website Mar. 20, 2014, 5 pages.

Chinese Office Action, Application No. 201280046021.6, 11 pages, May 17, 2016.

* cited by examiner

```
1. _bacnet._tcp                              PTR   service_a._bacnet._tcp
2. _bacnet._tcp                              PTR   service_b._bacnet._tcp
3. _bacnet._tcp                              TXT   listtype=linked next=first._sub._bacnet._tcp
4. first._sub._bacnet._tcp                   PTR   service_c._first._sub._bacnet._tcp
5. first._sub._bacnet._tcp                   PTR   service_d._first._sub._bacnet._tcp
6. service_d._first._sub._bacnet._tcp        SRV   0 0 80 aHost.example.com
7. service_d._first._sub._bacnet._tcp        TXT   URI=/service_d/o
```

METHOD AND SYSTEM FOR DOMAIN NAME SYSTEM BASED DISCOVERY OF DEVICES AND OBJECTS

CROSS REFERENCE TO RELATED APPLICATIONS

This application is based on and hereby claims priority to International Application No. PCT/EP2012/067105 filed on Sep. 3, 2012 and European Application No. 11182014.8 filed on Sep. 20, 2011, the contents of which are hereby incorporated by reference.

BACKGROUND

The present invention relates to a method and a system for Domain Name System (commonly referred to as "DNS") based retrieval of service instances.

DNS provides a key service on a network, such as the Internet, in translating queries for domain names, which represent text-descriptive resources, into network addresses that are usually represented by a series of digits. For instance, the DNS is the name resolution system applied in the Internet. It is used to resolve names to Internet Protocol (referred to as "IP") addresses and vice versa. Newer approaches, such as DNS-based Service Discovery (referred to as "DNS-SD") described in the DNS-SD draft "DNS-Based Service Discovery" (http:tools.ietf.org/pdf/draft-cheshire-dnsext-dns-sd-10.txt), propose to use the DNS also for the discovery of services, such as printers.

The DNS-SD draft defines a set of specific rules and methodologies for querying a DNS server, but uses already existing DNS resource record (RR) types. In addition, the DNS-SD draft defines a basic syntax to store additional information regarding a service. The DNS RR are named and structured to facilitate service discovery. Therefore, given a type of service that a client is looking for, and a domain in which the client is looking for that service, this allows clients to discover a list of named instances of that desired service, using standard DNS queries.

DNS-SD defines a service instance as a concatenation of <Instance>.<Service>.<Domain>, wherein the <Domain>part represents the DNS subdomain in which the service instances are registered, the <Service> part identifies the service types according RFC 2782 (http://tools.ietf.org/pdf/rfc2782), and the <Instance> part names the service instance.

Service types (<Service>) may include two levels of hierarchy and follow the general convention of [_subtype._sub.]_type._proto, where "_proto" denotes the IP transport protocol used, "_type" names the service type, the keyword "_sub" indicates that a second level of hierarchy is available, and "_subtype" names the service subtype.

DNS-SD uses the following resource record types to represent services:
SRV RRs: store the individual service instances, i.e. resolve from the service instance to the host and have the following form when reduced to relevant arguments (left: argument of query, middle: type of query, right: response to query):
<Instance>.<Service>.<Domain> SRV <Host> <Port>;
TXT RRs: store additional information regarding a individual service instance, i.e.
<Instance>.<Service>.<Domain> TXT <"Arbitrary text attributes">;
PTR RRs: link the type of a service with the individual service instance, i.e.
<Service>.<Domain> PTR <Instance>.<Service>.<Domain>.

For each service instance, an SRV and a TXT RR are stored in the DNS. The SRV RR is basically used to resolve the host and port of the service instance. The corresponding TXT RR may contain additional information about the specific service instance. The content of the TXT RR is formatted as a key/value pair with the first equal sign ("=") as separator (e.g. "papersize=A4" for a printer service). The TXT RR may contain multiple key/value pairs. In binary representation each key/value pair is stored with a length field preceding the content. The PTR RR is used to resolve a service type to the individual service instances, i.e. querying for all web servers within a domain might be accomplished with a DNS query for the service type "_http._tcp.<Domain>" and will result in a list of all specific web server instances.

A major problem of the DNS is the size limitation of answers to 64 kB, which limits the number of services of a single category in a domain to approximately 700. This limitation is a main obstacle for larger IP based systems. For instance, a large building automation system may include 5000 devices with 500000 objects/services.

For overcoming this problem, some solutions have been proposed, such as
Engineering and database on a management station;
Web Services Discovery;
Lightweight Directory Access Protocol (LDAP).
Unfortunately, such solutions require additional infrastructure or are not flexible enough for being efficient. Even if they might be used for a less limited service discovery, they need additional effort in terms of time and/or equipment, since the existing infrastructure needs to be extended to implement these solutions. Moreover, the administrators of the IT infrastructure that is used to network the building automation and control networks (BACnet) devices may not allow usage of the above-mentioned protocols.

SUMMARY

One possible goal is to provide a method and a system for DNS based Discovery of Devices and Objects that is flexible, efficient, free of the need of additional protocols, and allows discovering an arbitrary number of devices/objects/services from a DNS server.

The inventors propose a computer implemented method for retrieving, in a client-server computer network, a list of specific service instances among several service instances belonging to one or several types of services, each type of service being associated to a list of service instances, wherein the specific service instance is requested in a request for a specific service type made by a client via a client application, the method comprising:
a reception by a DNS of the request for the specific service instance list, said request being e.g. forwarded by the client application to said DNS system;
a resolution of the request by said DNS, wherein the resolution of the request comprises:
1) a determination from information recorded in a DNS system memory of said DNS system and conveyed in the request of a first type $T_1$ of service and of a first list $L_1$ of service instances associated to said first type $T_1$ of service;
2) a search for a linked structure comprised in a TXT resource record of said first type $T_1$ of service, wherein said linked structure is designed for determining and identifying another list $L_2$ of service instances associated to a subtype $T_2$ of service;

3) iterating for i=2, ..., N+1, N being the number of subtypes of services associated to the first type $T_1$ of service: if a linked structure and its corresponding subtype $T_i$ of service exist and are found, then searching for a linked structure comprised in a TXT resource record of said subtype $T_i$ of service, wherein said linked structure is designed for determining and identifying a list $L_{i+1}$ of service instances associated to a subtype $T_{i+1}$ of service.

Preferentially, the resolution of the request by said DNS and a client application may comprise fourth and fifth parts for in that:

4) for each list $L_i$, i=1, ..., N+1, of service instances identified according to at least one of the parts 1-3, determining if the specific service instance belongs to said list $L_i$;

5) if the specific service instance belongs to one of the lists $L_i$ (i=1, ..., N+1) determined according to at least one of the parts 1-3, stopping the iteration according to part 3 and the search for a linked structure and returning information related to said specific service instance to the client, said information returned to the client comprising e.g. PTR RRs, SRV RRs, and/or TXT RRs, else keeping searching for said specific service instance according to at least one of the parts 1-4 until list $L_{N+1}$ of service instances and subtype $T_{N+1}$ of service have been checked according to part 4 for determining if said specific service instance belongs to one of said lists $L_i$ (i=1, ..., N+1);

6) if said specific service instance belongs to none of said lists $L_i$ (i=1, ..., N+1), returning to the client an error message.

The inventors also propose a Domain Name System for resolving names and discovering services in a distributive environment comprising:

a name server;

at least one connection adapted for connecting said DNS to at least one client device;

said Domain Name System being able to cooperate with at least one client application residing in the client device;

characterized in that the name server comprises information and a client application configured for working according to the proposed method with the client application residing in the client device.

In particular, the DNS might be used in a distributed client-server computer network, so that when a first name server receives a request, e.g. from a client, for querying a service from a second name server in the network, wherein said second name server is for example identified in the first name server by its domain responsibility, the first name server is able to send a query request to the second name server, which is then able to search and return the service instance list and/or additional information concerning the request according to the above-mentioned computer implemented method. Preferentially, the first name server is able to delegate subsequent requests, wherein said subsequent requests come from the client for information stored in the second name server in a same way.

The inventors propose therefore an extension to the semantics of DNS-SD, which allows retrieving extended lists of service instances in a DNS database. Preferentially, the proposed method can be extended to represent almost arbitrary integration of metadata into the DNS database. Advantageously, a full implementation of DNS-SD is not required.

The resource record of the DNS comprises a TXT RR for the service type, which advantageously allows additional storage of meta-information notably related to the service type. The definition of the TXT RR is in particular extended by to the following syntax:

TXT RRs: store additional information regarding an individual service instance and services, i.e.

<Instance>.<Service>.<Domain> TXT<"Arbitrary text attributes">

<Service>.<Domain> TXT<"Arbitrary text Attributes">

Advantageously, since the first type of service $T_1$ is either publicly available (IETF resp. IANA maintained list) or well known to the client-application, the associated TXT RR builds a natural entry point for the extended service discovery, i.e. for the discovery of the List $L_i$ of service instances.

The linked structure implemented by the TXT RR associated to a service type advantageously allows to cope with the response size limitation of DNS responses. According to the proposals, the TXT RR for a service type, e.g. said first type $T_1$ of service or one of said subtypes of services $T_i$, is in particular configured for providing an indication that a linked structure exists (e.g. "listtype=linked") and a description of a next service, i.e. said subtype of service (e.g. "next=_list_continuation1._sub"). The subtype of service in the TXT RR associated to a service is in particular used to identify the service subtype for the continuation of the linked list.

Preferentially, the subtypes of service could be arbitrary and/or have a human readable (meaningful) name. In particular, the resolver might be free of a knowledge of a name of said subtype of service at the time of implementation. Preferentially, said resolver is able to interpret keys used in the TXT RR for the first type of services and/or said subtypes of services, wherein said keys are configured for giving hints to the linked list.

Preferentially, different types of linked structures might be associated to the TXT RR for accessing one of said subtype $T_i$ of service. The linked structure is preferentially arbitrary, so that the method is able to work with various structures. But preferentially, the linked structure is a linked list, or a numbered list, or a tree type list, or a double linked list. In particular, a reference to a subtype in the linked structure may be implicit, and free of an explicit storing of a reference to the subtype in any resource records. Preferentially, the numbered list might start with an indication "listtype=numbered", the number N of subtypes of services encoded as "numtypes=N", the first type $T_i$ of service being encoded as "basetype=my_type" and then the N subtypes $T_i$ (i=2, ..., N+1) of services being encoded as {"my_type1=list_continuation1._sub", ... , "my_typeN=list_continuationN._sub"}. Preferentially, the resolver is able to concatenate the first type name and the number to obtain actual subtypes.

Preferentially, additional information might be encoded in the TXT RR associated to a service type. This may be, but is not restricted to, an availability of a specific service type hierarchy or a distinction between resources and service instances of Internet of Things (IoT) hosts. For instance, T1 might relate to a "list of devices", and the TXT RR associated to T1 might not only comprise a link to the continuation of the list (T2), but also a link to a list of objects O1. Advantageously, only one well known entry point is therefore needed.

Preferentially, the semantic and information used for defining the linked structure depends on the (client-)application or service type and may be defined either in a known services list such as IETF, or respectively IANA, or may be subject to application specific standardization. For example, the client-application may comprise information/data that are configured for pointing to relevant linked list and are notably convenient for being used by the DNS according to the proposed method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figures 1, 2:
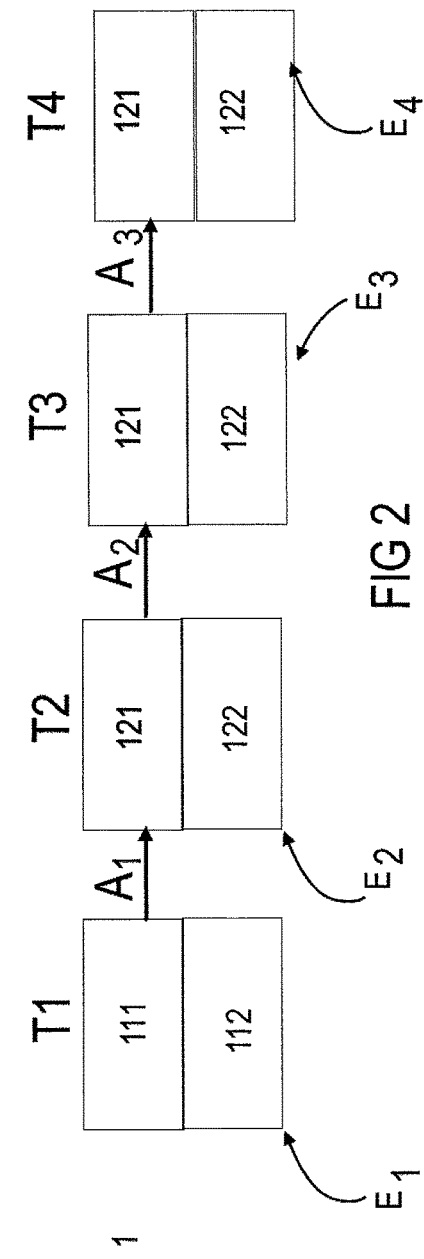
FIG. 1 is an example of a proposed configuration for a DNS configuration containing BACnet services/devices.
FIG. 2 is an example of a linked list.

Reference will now be made in detail to the preferred embodiments of the present invention, examples of which are illustrated in the accompanying drawings, wherein like reference numerals refer to like elements throughout.

FIG. 1 is an illustration of the proposed principle of resolution process for discovering a specific service instance.

The example proposed DNS name server configuration comprises in particular: two lines (line 1 and line 2) configured for defining two service/device instances "service_a" and "service_b" of the first type of service "_bacnet._tcp", wherein said first type of service represents, in this example, the well known entry point for BACnet services;

one line (line 3) configured for comprising a link list structure defining a link for accessing to another list of BACnet services, the TXT RR comprising preferentially as attributes the type of the list "linked" and the link to the next service type, i.e. to the subtype of service "_first._sub._bacnet.tcp";

two lines (line 4 and line 5) configured for defining two service/device instances "service_c" and "service_d" of the subtype of service "_first._sub._bacnet._tcp" as indicated in line 3;

two lines (line 6 and line 7) give an example of an usage of a SRV and TXT RR for a service instance. The service instance "service_d._first._sub._bacnet._tcp" resolves to the host "aHost.example.com" on port "80". The TXT RR in line 7 states additional information about this service, e.g. the URI "/service_d/o" for accessing the service.

The above-mentioned DNS name server configuration has been reduced to relevant lines, omitting domain information.

FIG. 2 illustrates a linked list structure 1. Preferentially, the linked list structure comprises at least one linked list. Each linked list is associated to a subtype of service that is able to extend to service instances of the first type of service. Each subtype of service comprises data elements $E_2$, $E_3$, $E_4$, and each data element $E_2$, $E_3$, $E_4$ comprises at least one link 121 to another data element of another subtype of service, and some data 122.

The first type $T_1$ of service comprises in particular data elements $E_1$ and might be associated to a first list $L_1$ of service instances. Preferentially, said data elements $E_1$ of the first type $T_1$ of service comprise an entry point 111, that comprises information where another data element $E_2$ can be found (i.e. the data element $E_2$ of the first linked list associated to the subtype $T_2$ of service and that might be linked to the first type $T_1$ of service via a connection $A_1$). Said data elements $E_1$ of the first type $T_1$ of service might also comprise other data 112.

The information of the entry point 111 is preferentially configured for providing a first link or connection $A_1$ to the data elements $E_2$ of the subtype $T_2$ of service. According to the present embodiment and preferentially, another connection $A_2$ to the data elements $E_3$ of the subtype $T_3$ of service is provided by a link 121 of the subtype $T_2$ of service, and a last connection $A_3$ to the data elements $E_4$ of the subtype $T_4$ of service is provided by a link 121 of the subtype $T_3$ of service. The link 121 of the data elements $E_4$ of the subtype $T_4$ of service does in particular not provide any link to data elements of another subtype of service. Preferentially, each link 121 of the subtypes of services is configured for comprising information indicating where and how to find the data elements of another subtype of service.

For the BACnet example above, a data element is identified by the lines starting with the identical service type (here: "_bacnet._tcp" and "_first._sub._bacnet._tcp"). Lines with RR type "PTR" represent in FIG. 1 the data part of a data element. Lines with RR type "TXT" represent the link part of a data element.

Figure 3:
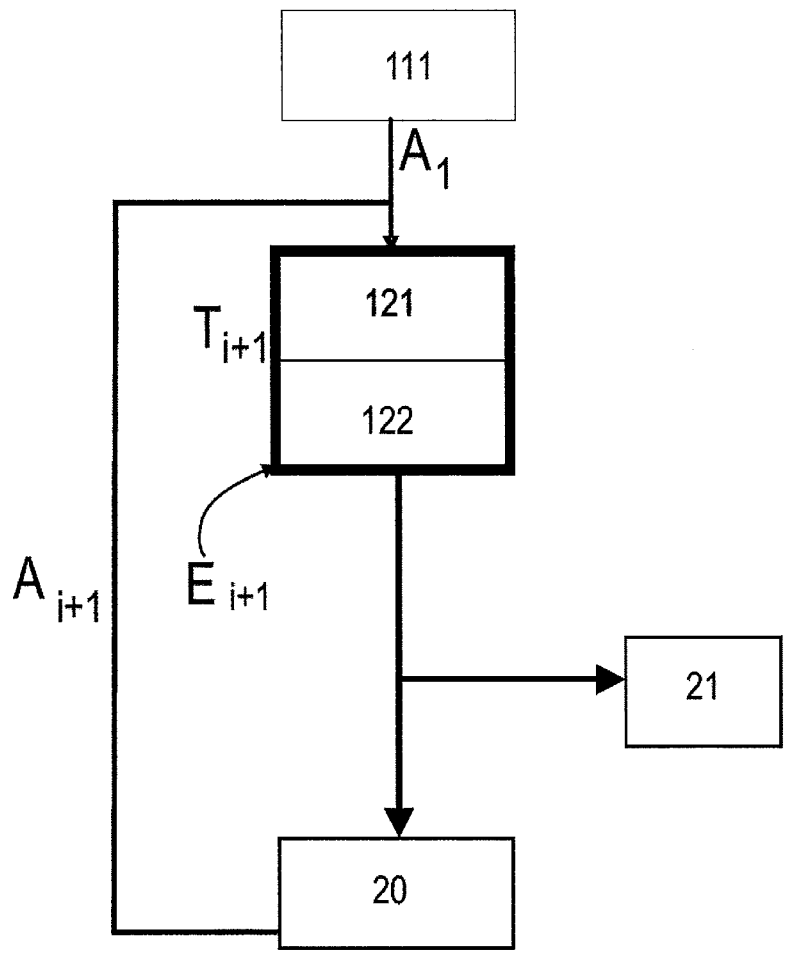
FIG. 3 is an example of linked list processing.

FIG. 3 illustrates the processing of a linked list according to a preferred embodiment. The entry point 111 is preferentially configured for providing information for a connection $A_1$ of the first type $T_1$ of service to the data elements $E_2$ (i=1) of a subtype $T_2$ (i=1) of service, in order to link a list of service instances associated to the subtype $T_2$ of service to a list of service instances of the first type $T_1$ of service. The entry point 111 is in particular chosen as a data either publicly available (IETF respectively IANA maintained list) or well known to the client-application. Therefore, since the entry point 111 of the first type $T_1$ of service is known, the list of service instances associated to the subtype $T_2$ of service can be accessed via the first connection $A_1$, as well as its corresponding data elements $E_2$. The data 122 and the link 121 of the data elements $E_2$ are read by the DNS server. The client application is able to determine if the link 121 of the data elements $E_2$ of the subtype $T_2$ is valid 20, or if said link is not valid 21.

The client application is able to discover lists of services instances according to an iterative process. Indeed, if said link is valid 20, then it provides information for a connection $A_2$ (i=1) of the subtype $T_2$ of service to the data elements $E_3$ (i=2) of a subtype $T_3$ (i=2) of service, in order to link a list of service instances associated to the subtype $T_3$ of service to a list of service instances of the subtype $T_2$ of service. Then, the data 122 and the link 121 of the data elements $E_3$ are read by the DNS server, and the DNS server determines if the link 121 of the data elements $E_3$ of the subtype $T_3$ is valid 20, or if said link is not valid 21. And the proposed method iterates the above mentioned process for the number N of subtypes of services associated to the first type $T_1$ of service, i.e. until i=N. If a link 121 is not valid 21 or does not exist, it is interpreted as empty by the DNS server, and the latter is able to stop the iteration.

In the BACnet example, the entry point is given by the known BACnet service type "_bacnet._tcp". The entry point is accessed by querying the DNS server for the PTR and TXT records of the service type "_bacnet._tcp". A linked list is embedded in the TXT resource record of each subtype of service, and the TXT resource record being configured for containing a valid link definition for extending the linked list structure to subsequent lists associated to subsequent subtypes of services. At each iteration, the TXT records of the subtype of service are checked by the DNS server for finding a linked list.

Advantageously, the discovery for BACnet installations might be interested in BACnet devices and BACnet objects. Preferentially, the TXT record associated to BACnet devices (e.g. "_bacnet._tcp") might comprise not only a linked list of devices, but an attribute defining a list of BACnet objects. For example, an attribute "BACnetObjects=_objects._sub._bacnet._tcp" could define a service type for such a list.

Finally, the use of TXT RR from DNS specifications for the realization of (arbitrary) linked data structures and, based on these data structures, of a structured service directory provides the following advantages compared to related art techniques:

a semantic ordering: services are grouped according to their service type;

no size limitation: it allows an implementation of service directories of arbitrary size while being able to query list of services of certain types that stay within the response size constraint of 64 kB;

it uses a DNS system usually already available as part of the IT infrastructure. Therefore, no additional protocols need to be admitted if DNS is used;

common standard Internet technology (DNS) is used for service discovery. This makes it much easier to use the service discovery mechanism in managed IT infrastructures that may not allow new (not well-proven) technologies or alternate discovery/directory protocols;

the method is applicable to a broad range of problems and linked data structures (far beyond the BACnet examples based on linked lists). It extends the capabilities of the DNS to represent (service) information without leaving the established DNS specification;

the proposals enable flexible use of human readable service types, respectively semantic structures of information even in the operational phase. The service types/categories used must not be specified beforehand but can be extended anytime; the ideas may find their way into the DNS specification (e.g. in the form of a new IETF RFC). Individual applications, such as BACnet, might standardize service specific semantics following the principles given above.

Figure 4:
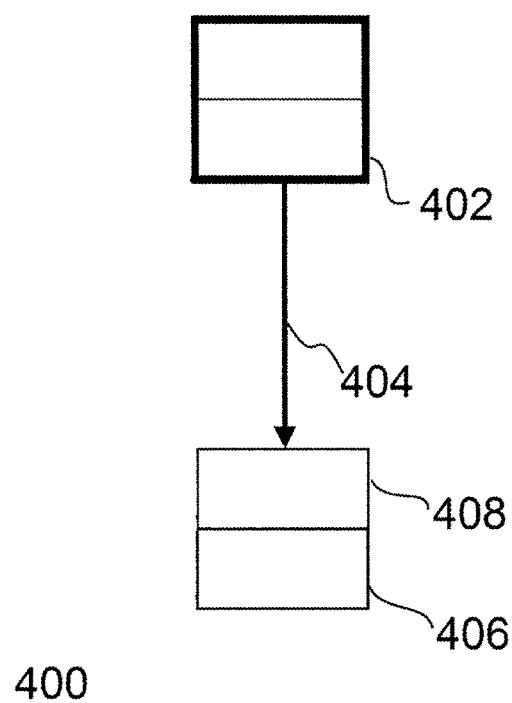
FIG. 4 shows a Domain Name System.

A Domain Name System (DNS) 400 for resolving names and discovering services in a distributive environment is shown in FIG. 4. The DNS 400 includes a name server 402. At least one connection 404 connects the Domain Name System 400 to at least one client device 406. The Domain Name System 400 is able to cooperate with a client application 408 residing in the client device 406.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865(Fed. Cir. 2004).

The invention claimed is:

1. A computer implemented method for processing in a client-server computer network a request for a specific service type, the method comprising:

receiving, by a Domain Name System (DNS), the request for a specific service type, the request being forwarded to the Domain Name System from a client via a client application; and resolving the request by the Domain Name System, wherein the resolving of the request comprises:

determining, from information recorded in a DNS memory of the Domain Name System and from information included in the request, a first type $T_1$ of service and a first list $L_1$ of service instances associated with the first type $T_1$ of service;

searching for a linked structure in a text (TXT) resource record, the linked structure being associated with the first type $T_1$ of service, the linked structure identifying a second list $L_2$ of service instances associated with a subtype $T_2$ of service;

iteratively, for each subtype $T_i$ of service, where i=2, ..., N+1, wherein N represents a number of subtypes of services associated with the first type $T_1$ of service and wherein N is at least 1, searching in a text resource record for the subtype $T_i$ of service, for a linked structure associated with the subtype $T_i$ of service, the linked structure identifying a list $L_{i+1}$ of service instances associated with a subtype $T_{i+1}$ of service;

wherein (a) the first list $L_1$ of service instances associated with the first type $T_1$ of service, (b) the second list $L_2$ of service instances associated with a subtype $T_2$ of service, and (c) each list $L_{i+1}$ of service instances identified by the iterative search of the text resource record for each subtype $T_i$ of service, collectively define a plurality of service instance lists;

generating a response to the request for a specific service type based on one or more of the plurality of service instance lists; and communicating the response to the client.

2. A computer implemented method according to claim 1, wherein the request for the specific service type serves to request a specific service instance, and generating the response to the request for a specific service type based on one or more of the plurality of service instance lists and communicating the response to the client comprises:

for each list $L_i$, (i=1, ..., N+1), of service instances identified by a corresponding linked structure, wherein N is at least 1, determining if the specific service instance belongs to the respective list $L_i$;

if the specific service instance belongs to one of the lists $L_i$ (i=1, ..., N+1), stopping iteratively searching for the linked structure and returning information related to the specific service instance to the client, else continuing iteratively searching for the linked structure until list $L_{N+1}$ of service instances and subtype $T_{N+1}$ of service have been checked for determining if the specific service instance belongs to one of said lists $L_i$ (i=1, ..., N+1); and if the specific service instance belongs to none of said lists $L_i$ (i=1, ..., N+1), returning to the client an error message.

3. A computer implemented method according to claim 2, wherein the information related to said specific service and returned to the client comprises pointer return results (PTR RR), service record return results (SRV RR), and/or text return results (TXT RR).

4. A computer implemented method according to claim 1, wherein the linked structure in the text (TXT) resource record is arbitrary.

5. A computer implemented method according to claim 1, wherein the linked structure in the text (TXT) resource record is a linked list, or a numbered list, or a tree type list, or a double linked list.

6. A computer implemented method according to claim 5, wherein
the numbered list starts with an indication "listtype=numbered",
a number N of subtypes of services is encoded as "numtypes=N",
the first type $T_1$ of service is encoded as "basetype=my_type", and
the N subtypes $T_i$ (i=2, ..., N+1) of services are encoded as {"my_type1=_list_continuation1._sub", ..., "my_typeN=_list_continuationN._sub"}.

7. A computer implemented method according to claim 1, wherein a reference to a subtype in the linked structure in the text (TXT) resource record is implicit, and free of an explicit storing in any resource records.

8. A computer implemented method according to claim 1, wherein the TXT resource record containing the linked structure associated with the first type $T_1$ of service or with a subtype $T_i$ of service, comprises encoded additional information concerning the first type $T_1$ of service or the subtype $T_i$ type of service.

9. A computer implemented method according to claim 8, wherein the additional information comprises an availability of a specific type hierarchy or a distinction between resources and services instances.

10. A Domain Name System (DNS) for resolving names and discovering services in a distributive environment, comprising:
a name server device;
at least one connection adapted for connecting the Domain Name System to at least one client device;
said Domain Name System being able to cooperate with a client application residing in the at least one client device;
wherein the name server device is configured to perform a method for retrieving a list of specific service instances, the method comprising:
receiving, by the Domain Name System, a request for a specific service type, the request being forwarded to the Domain Name System from a client via the client application; and
resolving the request by the Domain Name System, wherein the resolving of the request comprises:
determining, from information recorded in a DNS memory of the Domain Name System and from information included in the request, a first type $T_1$ of service and a first list $L_1$ of service instances associated with said first type $T_1$ of service;
searching for a linked structure in a text (TXT) resource record, the linked structure being associated with the first type $T_1$ of service, the linked structure identifying a second list $L_2$ of service instances associated with a subtype $T_2$ of service; and
iteratively, for each subtype $T_i$ of service, where i=2, ..., N+1, and where N is at least 1, N being a number of subtypes of services associated with the first type $T_1$ of service, searching in a text resource record for the subtype $T_i$ of service, for a linked structure associated with the subtype $T_i$ of service, the linked structure identifying a list $L_{i+1}$ of service instances associated with a subtype $T_{i+1}$ of service;
wherein (a) the first list $L_1$ of service instances associated with the first type $T_1$ of service, (b) the second list $L_2$ of service instances associated with a subtype $T_2$ of service, and (c) each list $L_{i+1}$ of service instances identified by the iterative search of the text resource record for each subtype $T_i$ of service, collectively define a plurality of service instance lists;
generating a response to the request for a specific service type based on one or more of the plurality of service instance lists; and
communicating the response to the client.

* * * * *